(No Model.)
E. RICHMOND.
CAR COUPLING.
No. 318,140. Patented May 19, 1885.
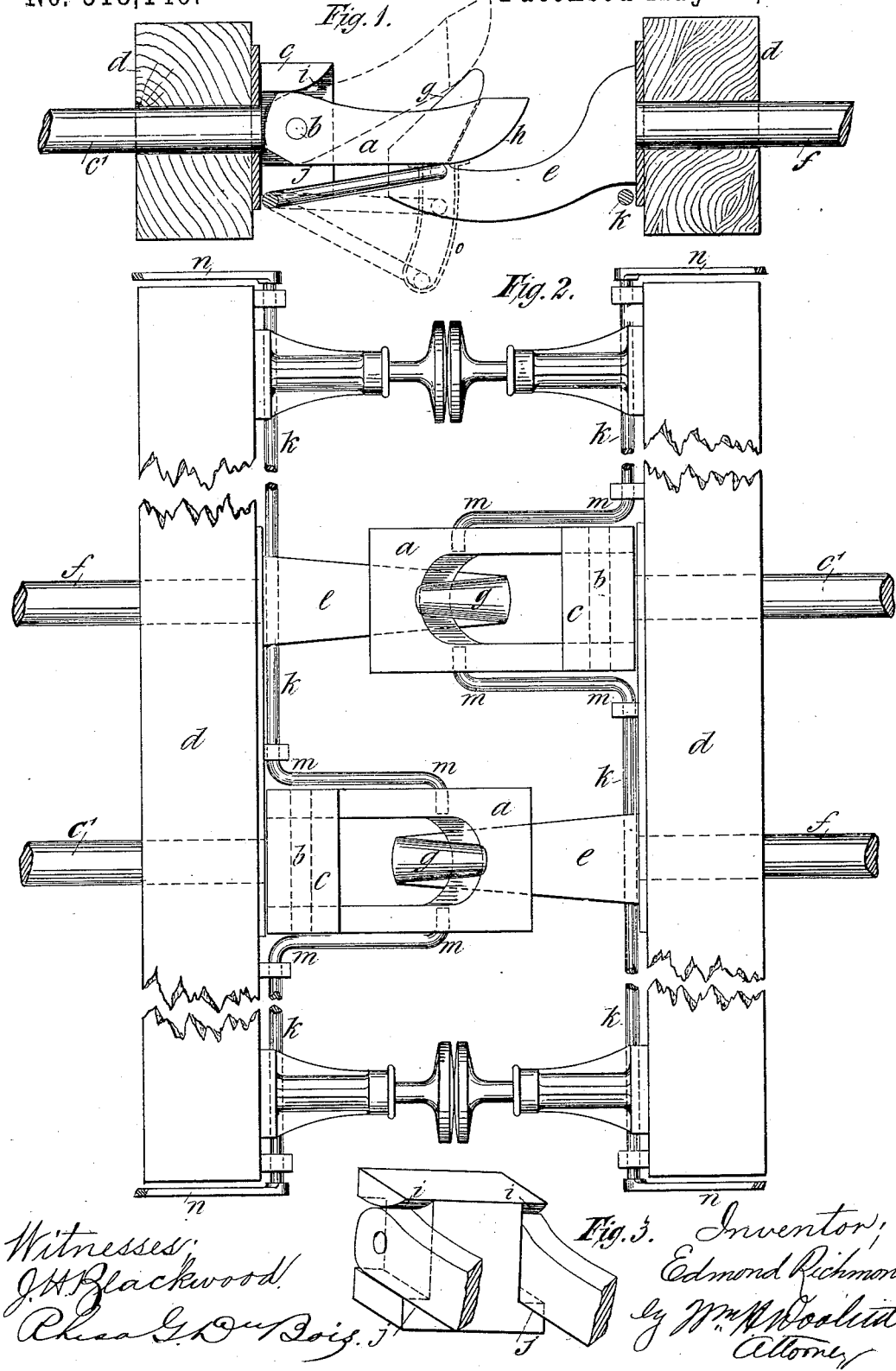
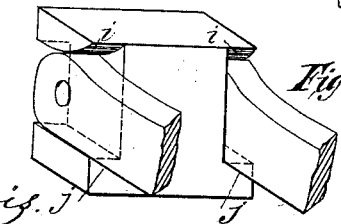

UNITED STATES PATENT OFFICE.

EDMOND RICHMOND, OF LEICESTER, COUNTY OF LEICESTER, ENGLAND.

CAR-COUPLING.

SPECIFICATION forming part of Letters Patent No. 318,140, dated May 19, 1885.

Application filed August 4, 1884. (No model.) Patented in England January 3, 1884, No. 498; in France July 22, 1884, No. 163,434; in Belgium July 22, 1884, No. 65,827, and in Canada September 19, 1884, No. 20,230.

*To all whom it may concern:*

Be it known that I, EDMOND RICHMOND, a subject of the Queen of Great Britain and Ireland, residing at Lower Hastings Street, in the town and county of Leicester, Kingdom of Great Britain and Ireland, have invented new and useful Improved Means or Apparatus for Coupling and Uncoupling Railway and other Vehicles, of which the following is a specification.

This invention relates to improved means or apparatus for coupling and uncoupling railway and other vehicles, whereby such vehicles may be readily and automatically coupled when brought together, and likewise be prevented from becoming accidentally uncoupled. For this purpose I arrange at the ends of the vehicles links and hooks so situated that when two vehicles are placed end to end there is a link on the one opposite a hook on the other, and vice versa. These links and hooks are so constructed and mounted that on meeting one slides over the other and the two become engaged by the simple act of pressing the buffers of one vehicle against those of the other. A guard carried by either the link or the hook, whichever is movable, prevents the two becoming unlocked by concussion or other accidental disturbance. For the purpose of effecting the disengagement of the hook and link I employ cranked rods supported in bearings at the ends of each vehicle and engaging with the link or hook to be lifted. The outer ends of these rods are provided with handles, whereby they may be partially rotated from the side of the vehicles without the necessity of any one passing between the vehicles for the purpose of uncoupling the links and hooks.

Referring to the accompanying drawings, Figure 1 is a side elevation, partly in section, showing my improved apparatus for coupling and uncoupling vehicles applied to the end frames of two vehicles, and Fig. 2 is a plan or top view of the same. Fig. 3 is a perspective view of a portion of a movable link with its supporting draw-head.

$a\ a$ are coupling-links pivoted at their rear ends by pins $b\ b$ in draw-heads $c\ c$, attached to the end frames, $d\ d$, of two adjacent vehicles. The pins $b\ b$ may be secured in their draw-heads in any convenient manner—as, for instance, by providing one end with a head and the other with a nut, or by riveting it on the outer sides of the links. The draw-heads $c\ c$ are each formed in one with or secured to draw-rods $c'\ c'$.

$e\ e$ are coupling-hooks secured to the end frames $d\ d$ in a horizontal or approximately-horizontal position and formed in one with or connected in any convenient manner to draw-rods $f f$. The upper side or outer face, $g$, of each hook is either curved or formed with an inclined surface, as shown, in order that the opposite link may easily slide or glide up it when pressed into contact therewith during the coupling operation. For this purpose also the lower side, $h$, of the front or outer end of the link is either formed with an inclined or a curved surface, as shown, the latter form being preferred, as it causes a smaller amount of friction during coupling.

The links $a\ a$ are made sufficiently wide to insure coupling with the coupling-hooks on an adjacent carriage and to allow sufficient lateral play when the vehicles are passing round curves.

The draw-heads $c\ c$ which support the coupling-links, and to which they are pivoted, as above stated, are provided on each side with ledges or projections $i$ above the rear ends of the coupling-links, and with ledges or projections $j$ below the said ends. These ledges or projections are clearly shown in Figs. 1 and 3, and constitute an important feature of my invention. The object of the lower ledges or projections is to support the coupling-links in a horizontal or other convenient position, whereby they may be left in readiness to become automatically coupled to another vehicle also fitted with my improved coupling apparatus when two such vehicles are brought together. The object of the upper ledges or projections is to limit the upward movement of the links during coupling and uncoupling.

The rear ends of the links are formed with flat surfaces $a'$, the advantage of so forming them being that the link strikes the top and bottom ledges or projections when coupling or uncoupling at the same moment, thereby reducing the strain on the draw-bar to a minimum.

I prefer to apply a link and hook of the kind above described to each end of vehicles, and at a height as uniform as possible from the level of the rails, one—say a link—being to the right, and the other—say a hook—to the left of the center of the end frame, and at an equal distance therefrom, the same order being observed in each case. By these means when two vehicles are brought together the link and hook at the end of one vehicle will always be opposite to a hook and link at the end of the other vehicle, and as the vehicles approach each other the links glide up the outer faces of the hooks, as shown in dotted lines in Fig. 1, and fall down their inner faces by their own weight, thus easily and automatically coupling the vehicles. In the drawings the apparatus is shown applied to two vehicles—such as passenger-carriages—in which the spring-buffers are always in contact when the vehicles are coupled. In the case of goods-trucks and the like, however, coupling takes place before the said buffers come in contact.

To uncouple the vehicles, I employ rods $k$, supported in bearings $l$, conveniently secured to the end of the vehicle below the buffers. The inner ends of these rods are cranked, as shown at $m$ $m$, part thereof extending beneath a portion of the link, as shown in Fig. 2. The outer ends of these rods are provided with handles $n$ extending outside the vehicle, whereby the rods may be partially rotated, and the links uncoupled from their hooks and raised upward until they come in contact with the ledges or projections $i$ on the draw-heads.

The links may be maintained in their upward position to prevent coupling when required by any suitable device—such, for instance, as a pin passing through the lever and entering a hole conveniently situated for the purpose in the side of the vehicle.

By the arrangement above described coupled vehicles may be readily uncoupled without the necessity of passing between the vehicles for the purpose and without danger.

In uncoupling carriages provided with spring-buffers in contact, these must be first compressed by the backing of the engine or by the attendants pushing the carriages together. To render this operation easy the inner faces of the links and hooks on passenger-carriages may be vertical instead of inclined, as shown in the drawings.

To insure greater security and prevent accidental uncoupling due to any violent concussion of the vehicles, I employ an iron guard, $o$, shown in dotted lines in Fig. 1, conveniently made in the form of a U, or approximately so, and secured to or suspended from the bottom or sides of the front end of each link. The projecting end of the cranked rod $k$, which is beneath the link, passes through this U-shaped guard, and when the vehicles are coupled, the said rod $k$ is held fixed in any convenient manner in about the position shown in dotted lines in Fig. 1. By this arrangement it will be readily seen that should the coupling-links attempt to move upward through accidental concussion or otherwise, the bottom portion of the guard will immediately come into contact with the cranked end of the rod $k$ and be prevented from rising.

When it is desired to uncouple the vehicles, the handles $n$ must be first unlocked and then turned, whereby the cranked inner ends of the rods $k$ will first come into the position shown in full lines in Fig. 1, immediately beneath the coupling-link; and upon continuing the movement the link will be raised clear of the hook and the vehicles uncoupled, the form and position of the guard $o$ not interfering with this operation. The cranked inner ends of the rods $k$ are maintained in a horizontal position, as shown in full lines in Fig. 1, when in its normal position, or when the vehicles are uncoupled.

Instead of the hook being fixed and the link movable, as above described, both may be movable, or the link may be fixed and the hook movable, either as a whole or in part—that is to say, the body portion of the hook, with its projecting head or hook portion proper, may be in one piece and move together when coupling, or the projecting head or hook portion may be pivoted in the outer end or ends of the hook-body and be the part that rises when the fixed link passes beneath it and in contact therewith. In this case when the link has passed sufficiently far underneath the movable head or hook portion the latter falls by gravity into the opening of the link, and thus effects the coupling operation. When uncoupling is desired, the body and head or hook portion of the movable hook are lifted together on the center of motion in the supporting draw-head. When both the link and hook are movable, either of them may be pressed downward in coupling or uncoupling, and then be automatically forced upward to a horizontal position by means of a spring coiled round a curved rod attached at one end to the upper sides of the link or hook, the other end of the said rod being arranged to move through a hole or slot in a projection attached to the top of the draw-head.

Again, instead of employing my improved link and hook at each end of a vehicle on each side of the center, as shown in the drawings, a vehicle may be provided with a hook at one end and a link at the opposite end, each arranged in the center of the end frame of the vehicle, and conveniently attached to the draw-head in place of the hooks and chains ordinarily employed; but I prefer the arrangement shown and described, as it allows a vehicle to be coupled at either end, and also admits of the hooks and chains ordinarily employed remaining.

Also, instead of employing the ledges or projections $i$ $j$ hereinbefore described for supporting the movable link in a convenient position for automatic coupling and for limiting the movements of the said link, I may employ pins fixed in the two sides of the draw-head, and arranged to work in holes, grooves, or slots formed in the sides of the rear ends of the link, or the pins may be fixed in the inner sides of the rear ends of the link to work in holes or grooves in the sides of the draw-head, as will be readily understood, the length and position of the holes, grooves, or slots being such as to limit the movements of the link and hold it in any desired position for automatic coupling.

In lieu of employing the cranked rods $k$ for uncoupling the vehicles, cords, chains, or wire ropes may be employed, one of their ends being secured to the coupling-links and their other ends extending outward to the sides of the vehicles into a convenient position for operating them. The said cords, chains, or wire ropes may be supported and guided in the necessary directions by means of pulleys, rings, or the like suitably secured to the ends of the vehicles. With this arrangement the links may be maintained in a raised or other desired position by placing rings secured to the ends of the cords, chains, or wire ropes over hooks fixed to the sides or ends of the vehicles. This uncoupling arrangement I prefer for uncoupling passenger-carriages, the uncoupling apparatus above described and shown in the drawings being more suitable for low trucks or vehicles.

The guard $o$ may be pivoted to the bottom or sides of the front end of the link at right angles to the position shown in Fig. 1, so that when two vehicles are coupled it shall hang vertically, the bottom portion of the guard being beneath and embracing the coupling-hook. Then, if by accident the link should be jerked upward, the bottom of the guard immediately strikes the under side of the hook and causes the link to instantly fall, thus preventing uncoupling. When the hook is movable the guard may be suspended from its front end, the said guard preventing uncoupling in this case by striking the under side of the link.

To enable the vehicles to be uncoupled when desired, a cord or chain may be attached to the guard and led away by pulleys or other means secured to each vehicle into a convenient position for handling. By pulling the said cord or chain the guard may be turned toward the draw-head of the link, and thus be clear of the hook for uncoupling. This guard may also be used in the reverse way—viz., if the hook is movable and the link fixed, the guard may be suspended from the hook, in which case it will strike the under side of the fixed link if the hook should be accidentally jerked upward.

It will be evident that the position of the links and hooks with relation to each other and to the vehicle may be more or less varied without departing from my invention.

What I claim is—

1. The combination, with the link $a$ and hook $e$, of the guard $o$, substantially as described, for the purpose specified.

2. The combination of link $a$, hook $e$, draw-head $c$, rod $k$, handle $n$, and guard $o$, substantially as described, for the purposes specified.

EDMOND RICHMOND.

Witnesses:
    ALBERT PICKARD,
      43 *Lower Hastings St., Leicester.*
    THOMAS DANIEL BRIGGS,
      5 *Princess St., Leicester.*